US010097267B1

(12) United States Patent
Lee et al.

(10) Patent No.: US 10,097,267 B1
(45) Date of Patent: Oct. 9, 2018

(54) DEVICE FOR ELIMINATING OPTICAL NOISE

(71) Applicant: Southern Taiwan University of Science and Technology, Tainan (TW)

(72) Inventors: Da-Huei Lee, Tainan (TW); Wei-Wen Hu, Tainan (TW); Hsin-I Lee, Tainan (TW)

(73) Assignee: SOUTHERN TAIWAN UNIVERSITY OF SCIENCE AND TECHNOLOGY, Tainan (TW)

( * ) Notice: Subject to any disclaimer, the term of this patent is extended or adjusted under 35 U.S.C. 154(b) by 0 days.

(21) Appl. No.: 15/673,209

(22) Filed: Aug. 9, 2017

(30) Foreign Application Priority Data

Apr. 27, 2017 (TW) .............................. 106114148 A

(51) Int. Cl.
*H04B 10/2507* (2013.01)
*H04B 10/40* (2013.01)
*G02B 5/20* (2006.01)

(52) U.S. Cl.
CPC ......... *H04B 10/2507* (2013.01); *G02B 5/208* (2013.01); *H04B 10/40* (2013.01)

(58) Field of Classification Search
CPC ..................... H04B 10/2507; H04B 10/50572
USPC ................................................ 398/192–198
See application file for complete search history.

(56) References Cited

U.S. PATENT DOCUMENTS

| | | | |
|---|---|---|---|
| 3,751,166 A * | 8/1973 | Starkey | F41G 7/30 244/3.16 |
| 2002/0063160 A1 * | 5/2002 | Krichever | G02B 5/285 235/462.32 |
| 2003/0034398 A1 * | 2/2003 | Krichever | G02B 5/285 235/462.35 |
| 2005/0058457 A1 * | 3/2005 | MacDougall | H04B 10/2513 398/149 |
| 2007/0008530 A1 * | 1/2007 | Gibbs | G01J 1/44 356/368 |
| 2013/0221211 A1 * | 8/2013 | Witzens | H04B 10/58 250/227.11 |
| 2013/0330089 A1 * | 12/2013 | Chow | H04B 10/116 398/135 |

(Continued)

OTHER PUBLICATIONS

Parihar et al; Optical wireless communication using LED and improvement in noise parameter; 2016, IRJET; pp. 613-615.*

(Continued)

*Primary Examiner* — Amritbir Sandhu
(74) *Attorney, Agent, or Firm* — Womble Bond Dickinson (US) LLP

(57) ABSTRACT

A device for eliminating optical noise receives an optical signal, and includes a first filter which transmits light falling within a same wavelength range as the optical signal, so as to output a filtered signal including the optical signal and first background noise, a second filter which transmits light having a wavelength falling outside the wavelength range of the optical signal, so as to output second background noise, a converter which converts the filtered signal into a first electrical signal and converts the second background noise into a second electrical signal, and an operational unit which performs a mathematical operation on products respectively of the first and second electrical signals and first and second parameters, to result in an output signal.

10 Claims, 2 Drawing Sheets

(56) References Cited

U.S. PATENT DOCUMENTS

2015/0236784 A1* 8/2015 Vahala ............... H03L 7/08
398/115

OTHER PUBLICATIONS

Chow et al; Background optical noises circumvention in LED optical wireless systems using OFDM; Apr. 2013; IEEE vol. 5, No. 2.*

Yang et al; Reduction of optical interference by wavelength filtering in RGB-LED based indoor VLC system; 2011; OECC; pp. 551-552.*

* cited by examiner

US 10,097,267 B1

DEVICE FOR ELIMINATING OPTICAL NOISE

CROSS-REFERENCE TO RELATED APPLICATION

This application claims priority of Taiwanese Invention Patent Application No. 106114148, filed on Apr. 27, 2017.

FIELD

The disclosure relates to a device, and more particularly to a device for eliminating optical noise.

BACKGROUND

A conventional infrared receiver disclosed in Taiwanese Invention Patent No. I240501 includes a filter which may be utilized to block optical noise having wavelengths other than the wavelengths of infrared, so as to improve performance of the infrared receiver. However, the filter cannot block optical noise having wavelengths falling within the infrared wavelength range, so illuminance of the optical noise having wavelengths falling within the infrared wavelength range, in addition to illuminance of an infrared signal, would both be detected by the infrared receiver. If the illuminance of the optical noise is so high as to interfere with the infrared signal, the infrared signal received by the infrared receiver may be more prone to errors.

U.S. Patent Application Publication No. US 2013/0330089 A1 discloses a background noise-immune LED-based communication device, which includes at least one LED signal transmitter emitting a Manchester code signal generated by a Manchester coding technology, created in an attempt to decrease noise interference and promote signal quality. Nevertheless, if strength of background optical noise surpasses a certain extent, performance of the Manchester code signal may be adversely affected.

SUMMARY

Therefore, an object of the disclosure is to provide a device for eliminating optical noise that can alleviate at least one of the drawbacks of the prior art.

The device for eliminating optical noise according to the disclosure is configured to receive an optical signal accompanied by the optical noise, and includes a first optical filter, a second optical filter, an optical to electrical converter and an operational unit.

The first optical filter transmits light falling within a wavelength range of the optical signal, so as to have an output of a filtered signal which includes the optical signal and first background noise falling within the wavelength range of the optical signal.

The second optical filter transmits light having a wavelength falling outside the wavelength range of the optical signal, so as to have an output of second background noise.

The optical to electrical converter is coupled to the first optical filter and the second optical filter for receiving respectively the filtered signal and the second background noise, converts the filtered signal into a first electrical signal that has a voltage positively proportional to illuminance of the filtered signal, and converts the second background noise into a second electrical signal that has a voltage positively proportional to illuminance of the second background noise.

The operational unit is coupled electrically to the optical to electrical converter for receiving the first electrical signal and the second electrical signal therefrom, and performs a mathematical operation on a product of the first electrical signal and a first parameter and a product of the second electrical signal and a second parameter, so as to result in an output signal that has a voltage positively proportional to illuminance of the optical signal, wherein the first parameter and the second parameter are associated with illuminance of the first background noise and the illuminance of the second background noise.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
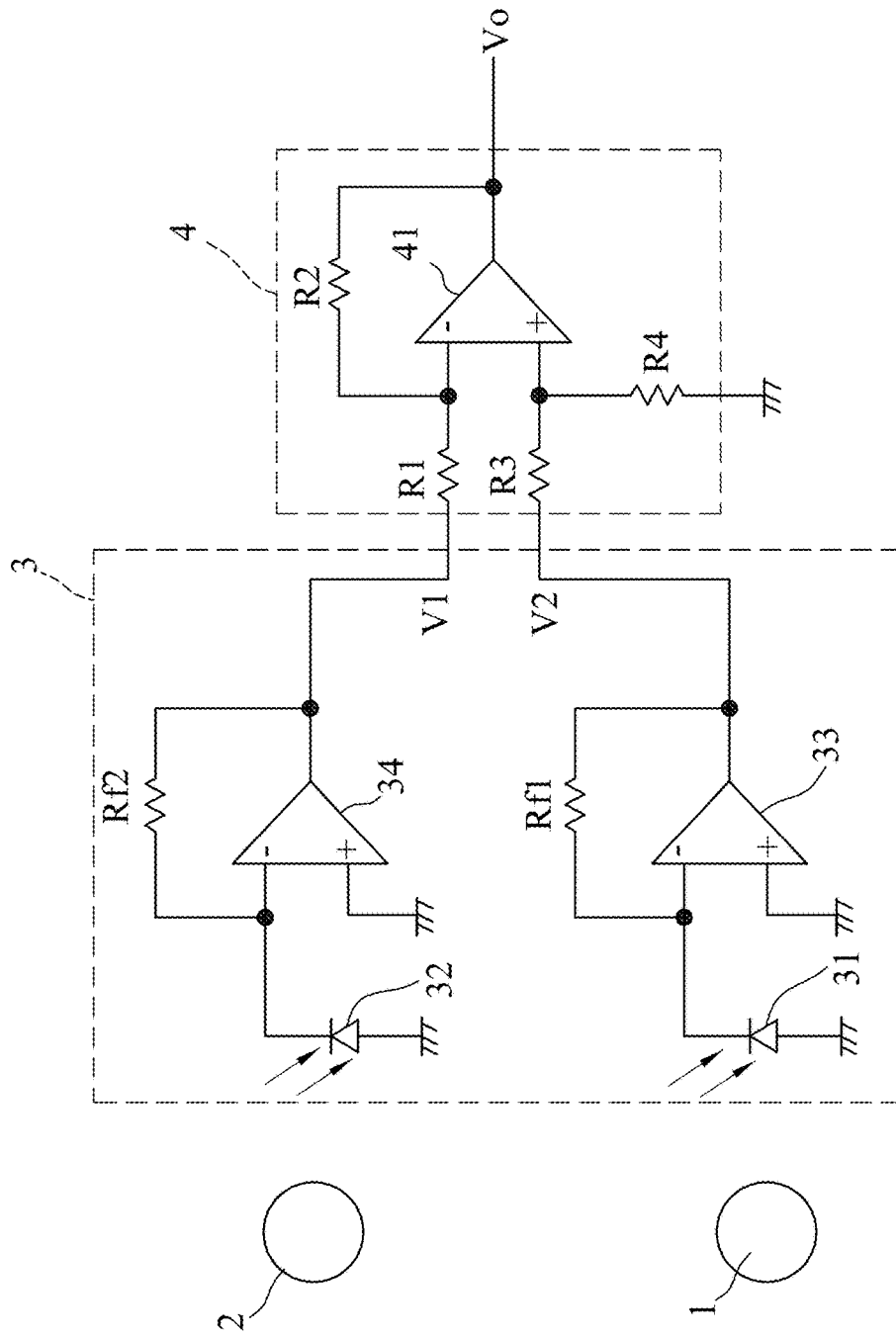
FIG. 1 is a circuit diagram illustrating an embodiment of a device for eliminating optical noise according to the disclosure.

Referring to FIG. 1, an embodiment of a device for eliminating optical noise according to the disclosure is adapted to receive an optical signal accompanied by the optical noise, and to prevent the optical noise from influencing performance of optical applications, such as laser range finding or optical communications. The optical noise may result from, for example, direct sunlight. In this embodiment, the device includes a first optical filter 1, a second optical filter 2, an optical to electrical converter 3 and an operational unit 4.

The first optical filter 1 only transmits light having a wavelength (or wavelengths) identical to that (or those) of the optical signal, so as to have an output of a filtered signal which includes the optical signal and first background noise falling with a wavelength range of the optical signal.

The second optical filter 2 only transmits light having a wavelength (or wavelengths) different from that (or those) of the optical signal, i.e., falling outside the wavelength range of the optical signal, so as to have an output of second background noise. In other words, the second background noise has a wavelength (or wavelengths) different from that (or those) of the optical signal. In this embodiment, each of the first optical filter 1 and the second optical filter 2 includes a filter lens, and the optical noise includes at least the first background noise and the second background noise.

The optical to electrical converter 3 is coupled to the first optical filter 1 and the second optical filter 2 for receiving respectively the filtered signal and the second background noise, converts the filtered signal into a first electrical signal that has a voltage (V2) positively proportional to illuminance of the filtered signal, and converts the second background noise into a second electrical signal that has a voltage (V1) positively proportional to illuminance of the second background noise.

The optical to electrical converter 3 includes a first photoelectric device 31, a first operational amplifier 33, a first feedback resistor (Rf1), a second photoelectric device 32, a second operational amplifier 34 and a second feedback resistor (Rf2).

The first photoelectric device 31 detects the filtered signal, and generates, based on the illuminance of the filtered signal, a first current having a magnitude positively proportional to the illuminance of the filtered signal.

The first operational amplifier 33 has an inverting input terminal connected electrically to the first photoelectric device 31 for receiving the first current, a grounded non-inverting input terminal, and an output terminal. The first operational amplifier 33 generates the first electrical signal according to the magnitude of the first current.

The first feedback resistor (Rf1) is connected electrically between the inverting input terminal and the output terminal of the first operational amplifier 33.

The second photoelectric device 32 detects the second background noise, and generates, based on the illuminance of the second background noise, a second current having a magnitude positively proportional to the illuminance of the second background noise. In this embodiment, each of the first photoelectric device 31 and the second photoelectric device 32 includes a photo diode.

The second operational amplifier 34 has an inverting input terminal connected electrically to the second photoelectric device 32 for receiving the second current, a grounded non-inverting input terminal, and an output terminal. The second operational amplifier 34 generates the second electrical signal according to the magnitude of the second current.

The second feedback resistor (Rf2) is connected electrically between the inverting input terminal and the output terminal of the second operational amplifier 34.

The operational unit 4 is coupled electrically to the optical to electrical converter 3 for receiving the first electrical signal and the second electrical signal therefrom, and performs a mathematical operation on a product of the first electrical signal and a first parameter and a product of the second electrical signal and a second parameter, so as to result in an output signal that has a voltage (Vo) positively proportional to illuminance of the optical signal. The first parameter and the second parameter are associated with illuminance of the first background noise and the illuminance of the second background noise, and a product of the first parameter and the illuminance of the second background noise equals a product of the second parameter and the illuminance of the first background noise.

The operational unit 4 includes a first resistor (R1), a second resistor (R2), a third resistor (R3), a fourth resistor (R4) and an operational amplifier 41.

The first resistor (R1) has a first terminal connected electrically to the optical to electrical converter 3 for receiving the second electrical signal therefrom, and a second terminal.

The second resistor (R2) has a first terminal connected electrically to the second terminal of the first resistor (R1), and a second terminal.

The third resistor (R3) has a first terminal connected electrically to the optical to electrical converter 3 for receiving the first electrical signal therefrom, and a second terminal.

The fourth resistor (R4) has a first terminal connected electrically to the second terminal of the third resistor (R3), and a second terminal connected to ground.

The operational amplifier 41 has an inverting input terminal connected electrically to the second terminal of the first resistor (R1), a non-inverting input terminal connected electrically to the second terminal of the third resistor (R3), and an output terminal connected electrically to the second terminal of the second resistor (R2). The operational amplifier 41 performs an abstraction operation based on the first electrical signal and the second electrical signal to result in the output signal.

In this embodiment, the first parameter is equal to $$\frac{r2}{r1},$$

and the second parameter is equal to $$\frac{1+\frac{r2}{r1}}{1+\frac{r3}{r4}},$$

where r1, r2, r3, r4 represent impedances of the first resistor (R1), the second resistor (R2), the third resistor (R3) and the fourth resistor (R4), respectively.

The voltage (Vo) of the output signal is equal to $-P1 \times V1 + P2 \times V2$, where P1 represents the first parameter, V2 represents the voltage of the first electrical signal, P2 represents the second parameter, and V1 represents the voltage of the second electrical signal.

It should be noted that the optical signal and the optical noise are in a frequency range of hundreds of terahertz, and wavelengths of the optical noise range between 300 nanometers to 900 nanometers (nm).

For better understanding of the disclosure, a theory associated with operation of the device is explained hereinafter.

Figure 2:
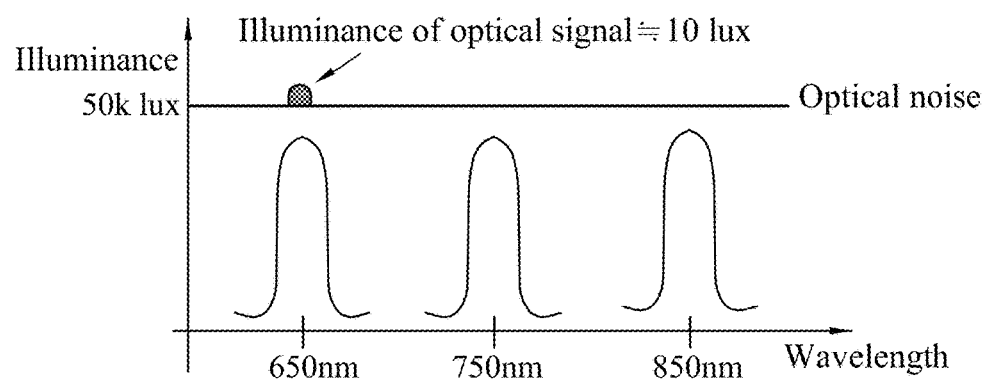
FIG. 2 is a diagram illustrating a relationship between illuminance and wavelength in a first scenario.

Referring to FIG. 2, a first scenario is depicted in which the optical noise has equal illuminance at different wavelengths, the illuminance being 50000 lux at wavelengths of 650 nm, 750 nm and 850 nm. The wavelength of the optical signal is 650 nm, and the optical signal has an illuminance of 10 lux. An optical filter which only transmits light having a wavelength of 650 nm is used, so that the light passing through and out of the optical filter has illuminance of 50010 lux, which is the sum of 50000 lux (illuminance of a component of the optical noise at 650 nm wavelength) and 10 lux (the illuminance of the optical signal). In the meantime, another optical filter which only transmits light having a wavelength of 750 nm is introduced to obtain an output light having illuminance of 50000 lux, i.e., illuminance of a component of the optical noise at 750 nm wavelength. Finally, the illuminance of the light having the wavelength of 750 nm is subtracted from the illuminance of the light having the wavelength of 650 nm (50010 lux minus 50000 lux) to obtain the illuminance, 10 lux, of the optical signal.

Figure 3:
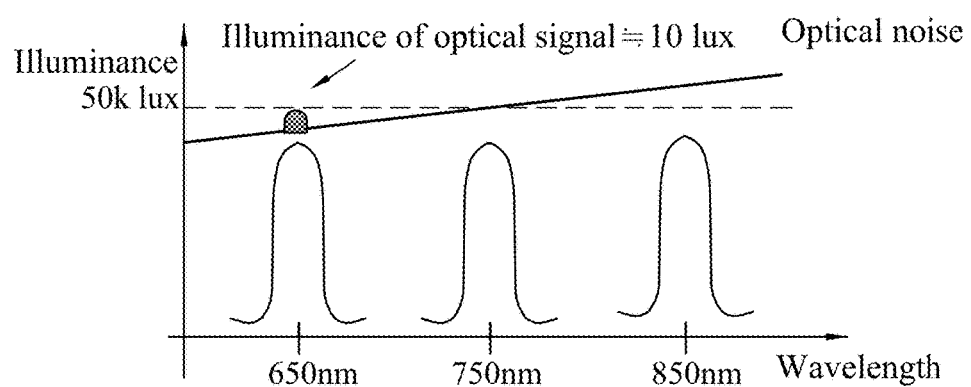
FIG. 3 is a diagram illustrating a relationship between illuminance and wavelength in a second scenario.

Referring to FIG. 3, in a second scenario, the optical noise has different illuminances at different wavelengths. For example, within a wavelength range of from 650 mm to 850 mm, there is a linear relationship between illuminance and wavelength. The wavelength of the optical signal is 650 nm, and the optical signal has an illuminance of 10 lux. An optical filter which only transmits light having a wavelength of 650 nm is used so that the light passing through the optical filter has illuminance of 40010 lux, which is the sum of 40000 lux (illuminance of a component of the optical noise at 650 nm wavelength) and 10 lux (the illuminance of the optical signal). Meanwhile, two other optical filters which only transmit lights having wavelengths of 750 nm and 850 nm, respectively, are introduced to obtain respectively output light having illuminance of 50000 lux, i.e., illuminance of a component of the optical noise at 750 nm wavelength, and output light having illuminance of 60000 lux, i.e., illuminance of a component of the optical noise at 850 nm wavelength. Finally, a formula provided below is used to calculate the illuminance of the optical signal.

$$L650 - \left[L750 - \left(\frac{L850 - L750}{850 - 750}\right) \times (750 - 650)\right],$$

where L650, L750 and L850 represent illuminances of the components of the optical noise at 650 nm wavelength, 750 nm wavelength and 850 nm wavelength, respectively.

The operations of the embodiment of the device for eliminating optical noise in the aforementioned first and second scenarios are explained hereinafter.

It should be noted that in the first scenario, the optical signal is exemplified as having the wavelength of 650 nm, and the illuminance of the optical signal when received by the device of the disclosure is 10 lux. The first optical filter 1 only transmits light having a wavelength of 650 nm while the second optical filter 2 only transmits light having a wavelength of 750 nm.

Referring to FIGS. 1 and 2, in the first scenario where the optical noise has equal illuminance of 50000 lux at different wavelengths (i.e., the illuminance of the first background noise having the wavelength of 650 nm is identical to that of the second background noise having the wavelength of 750 nm), the first resistor (R1), the second resistor (R2), the third resistor (R3) and the fourth resistor (R4) of the operational unit 4 are configured to have identical impedance, such that the first parameter and the second parameter are both equal to 1. The first optical filter 1 allows passage therethrough of the optical signal and the first background noise whose wavelengths are both 650 nm to result in the output of the filtered signal. The first photoelectrical device 31 detects the filtered signal, and generates, based on the illuminance of the filtered signal, the first current having the magnitude positively proportional to the illuminance of the filtered signal. The first operational amplifier 33 receives the first current, and generates the first electrical signal according to the magnitude of the first current. Similarly, the second optical filter 2 allows passage therethrough of the second background noise whose wavelength is 750 nm. The second photoelectrical device 32 detects the second background noise, and generates, based on the illuminance of the second background noise, the second current having the magnitude positively proportional to the illuminance of the second background noise. The second operational amplifier 34 receives the second current, and generates the second electrical signal according to the magnitude of the second current.

The operational unit 4 receives the first electrical signal and the second electrical signal, and outputs the output signal. Since the first parameter and the second parameter are both equal to 1, the voltage (Vo) of the output signal is equal to −V1+V2, where V1 and V2 represent the voltages of the second electrical signal and the first electrical signal, respectively.

Referring to FIGS. 1 and 3, in the second scenario where the optical noise has varying illuminances at different wavelengths (for example, there is a linear relationship between illuminance and wavelength within a wavelength of from 650 nm to 850 nm), by varying a ratio of the impedance of the first resistor (R1) to the impedance of the second resistor (R2), and a ratio of the impedance of the fourth resistor (R4) to the impedance of the third resistor (R3), the first parameter and the second parameter may be adjusted so as to facilitate elimination of the optical noise. It is noted that aside from the first and second background noises, the optical noise further includes third background noise having a wavelength of 850 nm, and a linear relationship between illuminance and wavelength can be extrapolated from the first, second and third background noises.

An illuminance measurement instrument may be utilized to measure the illuminances of the second background noise and the third background noise, and then a slope associated with the linear relationship between the illuminance and the wavelength in the wavelength range covering the first, second and third background noise may be calculated based on the illuminances of the second and third background noises thus measured and the wavelengths thereof. The slope equals $$\frac{L\lambda 2 - L\lambda 1}{\lambda 2 - \lambda 1},$$

where $L\lambda 2$ represents the illuminance of the third background noise, $L\lambda 1$ represents the illuminance of the second background noise, $\lambda 2$ represents the wavelength of the third background noise, and $\lambda 1$ represents the wavelength of the second background noise. Therefore, in the scenario as shown in FIG. 3 where the illuminance of the third background noise is 60000 lux and the illuminance of the second background noise is 50000 lux, the slope can be calculated to be 100.

In the second scenario, the optical signal is exemplified as having the wavelength of 650 nm, and the illuminance of the optical signal when received by the device of the disclosure is 10 lux. The first optical filter 1 only transmits light having a wavelength of 650 nm while the second optical filter 2 only transmits light having a wavelength of 850 nm.

In order to eliminate the optical noise by using the device according to the disclosure in the second scenario as shown in FIG. 3, the ratio of the impedance of the first resistor (R1) to the impedance of the second resistor (R2), and the ratio of the impedance of the fourth resistor (R4) to the impedance of the third resistor (R3) are both 3:2. In this way, the first parameter is equal to ⅔ and the second parameter is equal to 1. Therefore, the voltage (Vo) of the output signal is equal to $$-\frac{2}{3}V1 + V2.$$

The ratio of the impedance of the first resistor (R1) to the impedance of the second resistor (R2), and the ratio of the impedance of the fourth resistor (R4) to the impedance of the third resistor (R3) are decided based on the illuminances of the first and third background noises. For example, when the illuminance of the third background noise is 60000 lux and the illuminance of the first background noise is 40000 lux, the two ratios should be decided to be 3:2.

To sum up, the device for eliminating optical noise according to the disclosure is able to cancel out the first background noise whose wavelength is identical to that of the optical signal. The device utilizes the optical to electrical converter 3 to detect the filtered signal and the second background noise, and to perform optical to electrical conversion so as to generate the first electrical signal and the second electrical signal. Moreover, the operational unit 4 receives the first electrical signal and the second electrical signal, adjusts the first electrical signal and the second electrical signal using the second parameter and the first parameter, respectively, and performs the mathematical operation on the adjusted first electrical signal and the adjusted second electrical signal so as to obtain the output signal whose voltage (Vo) is positively proportional to the illuminance of the optical signal. In this way, the first background noise may be eliminated.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A device for eliminating optical noise, the device being configured to receive an optical signal accompanied by the optical noise, the device comprising:
    a first optical filter which transmits light within a wavelength range of the optical signal, so as to have a first output of a filtered signal which includes the optical signal and a first background noise falling within the wavelength range of the optical signal;
    a second optical filter which transmits light having a wavelength falling outside of the wavelength range of the optical signal, so as to have a second output of a second background noise;
    an optical to electrical converter which is coupled to said first optical filter and said second optical filter for receiving respectively the filtered signal and the second background noise, converts the filtered signal into a first electrical signal that has a first voltage positively proportional to illuminance of the filtered signal, and converts the second background noise into a second electrical signal that has a second voltage positively proportional to illuminance of the second background noise; and
    an operational unit which is coupled electrically to said optical to electrical converter for receiving the first electrical signal and the second electrical signal therefrom, and performs a mathematical operation on a first product of the first electrical signal and a first parameter and a second product of the second electrical signal and a second parameter, so as to result in a third output signal that has a third voltage positively proportional to illuminance of the optical signal, wherein the first parameter and the second parameter are associated with illuminance of the first background noise and the illuminance of the second background noise.

2. The device as claimed in claim 1, wherein a third product of the first parameter and the illuminance of the second background noise equals a fourth product of the second parameter and the illuminance of the first background noise.

3. The device as claimed in claim 1, wherein said operational unit includes:
    a first resistor which has a first terminal connected electrically to said optical to electrical converter for receiving the second electrical signal therefrom, and a second terminal;
    a second resistor which has a first terminal connected electrically to said second terminal of said first resistor, and a second terminal;
    a third resistor which has a first terminal connected electrically to said optical to electrical converter for receiving the first electrical signal therefrom, and a second terminal;
    a fourth resistor which has a first terminal connected electrically to said second terminal of said third resistor, and a second terminal connected to ground; and
    an operational amplifier which has an inverting input terminal connected electrically to said second terminal of said first resistor, a non-inverting input terminal connected electrically to said second terminal of said third resistor, and an output terminal connected electrically to said second terminal of said second resistor, said operational amplifier performing an abstraction operation based on the first electrical signal and the second electrical signal.

4. The device as claimed in claim 3, wherein the first parameter is associated with impedances of said first resistor and said second resistor, and the second parameter is associated with the impedances of said first resistor, said second resistor, said third resistor and said fourth resistor.

5. The said device as claimed in claim 4, wherein the first parameter is equal to $$\frac{r2}{r1},$$

and the second parameter is equal to $$\frac{1+\frac{r2}{r1}}{1+\frac{r3}{r4}},$$

where r1, r2, r3, r4 represent the impedances of said first resistor, said second resistor, said third resistor and said fourth resistor, respectively.

6. The device as claimed in claim 3, wherein when the optical noise has equal illuminance at different wavelengths, said first resistor, said second resistor, said third resistor and said fourth resistor of said operational unit are configured to have identical impedances.

7. The device as claimed in claim 1, wherein said optical to electrical converter includes:
    a first photoelectric device which detects the filtered signal, and generates, based on the illuminance of the filtered signal, a first current having a magnitude positively proportional to the illuminance of the filtered signal;

a first operational amplifier which has an inverting input terminal connected electrically to said first photoelectric device for receiving the first current, a non-inverting input terminal connected to ground, and an output terminal, said first operational amplifier generating the first electrical signal according to the magnitude of the first current;

a first feedback resistor which is connected electrically between said inverting input terminal and said output terminal of said first operational amplifier;

a second photoelectric device which detects the second background noise, and generates, based on the illuminance of the second background noise, a second current having a magnitude positively proportional to the illuminance of the second background noise;

a second operational amplifier which has an inverting input terminal connected electrically to said second photoelectric device for receiving the second current, a non-inverting input terminal connected to ground, and an output terminal, said second operational amplifier generating the second electrical signal according to the magnitude of the second current; and a second feedback resistor which is connected electrically between said inverting input terminal and said output terminal of said second operational amplifier.

8. The device as claimed in claim 1, wherein each of said first optical filter and said second optical filter includes a filter lens.

9. The device as claimed in claim 1, values of frequencies of the optical signal and the optical noise in terahertz have an order of magnitude of two.

10. The device as claimed in claim 1, wherein wavelengths of the optical noise range between 300 nanometers to 900 nanometers.

* * * * *